United States Patent
Florea et al.

(10) Patent No.: US 8,944,024 B2
(45) Date of Patent: Feb. 3, 2015

(54) MAGNETIC BEARING FOR USE IN RECIPROCATING INTERNAL COMBUSTION ENGINES

(75) Inventors: Radu C. Florea, San Antonio, TX (US); Darius Mehta, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 321 days.

(21) Appl. No.: 13/557,831

(22) Filed: Jul. 25, 2012

(65) Prior Publication Data
US 2014/0026843 A1   Jan. 30, 2014

(51) Int. Cl.
F02B 61/04   (2006.01)

(52) U.S. Cl.
USPC ..................................... 123/198 R

(58) Field of Classification Search
CPC .. F16C 25/045; F16C 25/086; F16C 32/0402; F16C 32/0406; F16C 32/0408; F16C 32/041; F16C 32/0412; F16C 32/0423; F16C 32/0425; F16C 32/0429; F16C 32/0431; F16C 32/0436; F16C 32/044; F16C 32/0444; F16C 32/047; F16C 32/0474; F16C 32/0478; F16C 33/765; F16C 39/06; F16C 39/063
USPC ........... 123/198 R, 198 DA, 197.4; 310/90.5; 384/133, 446, 250, 288, 294, 429, 457
See application file for complete search history.

(56) References Cited

U.S. PATENT DOCUMENTS

| | | | | |
|---|---|---|---|---|
| 4,387,935 A * | 6/1983 | Studer | ............ | 310/90.5 |
| 5,287,518 A * | 2/1994 | Miller et al. | ............ | 322/90 |
| 5,836,739 A * | 11/1998 | Haramura et al. | ............ | 415/104 |
| 6,626,138 B2 * | 9/2003 | Sayama et al. | ............ | 123/149 R |
| 7,466,052 B2 * | 12/2008 | Rozmus | ............ | 310/90.5 |
| 7,723,883 B2 * | 5/2010 | Ozaki et al. | ............ | 310/90.5 |
| 2003/0042813 A1 * | 3/2003 | Morikaku et al. | ............ | 310/91 |
| 2010/0288214 A1 * | 11/2010 | Pelmear | ............ | 123/41.86 |

OTHER PUBLICATIONS

Schweitzer, G., Maslen, E. (editors): "Magnetic Bearings—Theory, Design, and Application to Rotating Machinery". Contributors: H. Bleuler, M. Cole, P. Keogh, R. Larsonneur, E. Maslen, R. Nordmann, Y. Okada, G. Schweitzer, A. Traxler. Springer-Verlag, 2009, ISBN 978-3-642-00496-4.
Rakopoulos, C. D., Giakoumis, E. G."Diesel Engine Transient Operation: Principles of Operation and Simulation Analysis" Springer; 1 edition (Mar. 26, 2009), ISBN 1848823746.

* cited by examiner

*Primary Examiner* — Hung Q Nguyen
(74) *Attorney, Agent, or Firm* — Grossman, Tucker et al

(57) ABSTRACT

An internal combustion engine comprising a plurality of reciprocating pistons within an engine block, each piston having linear movement convertable to rotating movement via a connecting rod connecting each piston to a crankshaft; the crankshaft rotatable about a linear axis, the crankshaft having a plurality of main journals, each main journal rotatable on a main bearing which supports the crankshaft within the engine block; and wherein at least one of the main bearings comprises a fluid film bearing and a magnetic bearing.

38 Claims, 8 Drawing Sheets

MAGNETIC BEARING FOR USE IN RECIPROCATING INTERNAL COMBUSTION ENGINES

FIELD

The present disclosure relates to bearings used in reciprocating internal combustion engines, and more particularly, main bearings which support a crankshaft therein.

BACKGROUND

Electromagnets are typically used in rotating machinery applications as replacements for the widely used friction bearings or roller element bearings. The use of a magnetic field effectively suspends the rotating shaft of the considered machinery, allowing contactless bearing operation. The resulting magnetic bearing operates without requiring any lubricating agent and at extremely reduced friction losses. Advanced power electronics are required in order to maintain the concentricity between the shaft and the supporting bearing as well as to prevent unwanted shaft vibrations. Further reading regarding the different types of magnetic bearings may be found in "Magnetic Bearings—Theory, Design, and Application to Rotating Machinery," Schweitzer G., Maslen E. (editors), Springer-Verlag, 2009, ISBN 978-3-642-00496-4.

However, the crankshaft of an internal combustion engine experiences a different type of loading compared to the rotating shaft of rotating machinery such as a turbines. Due to the reciprocating piston motion and applied gas pressure, the load which has to be supported by the main bearings is periodic and is characterized by short pulses, which may be further discussed in "Diesel Engine Transient Operation: Principles of Operation and Simulation Analysis" Rakopoulos, C. D., Giakoumis, E. G., Springer, first edition (Mar. 26, 2009), ISBN 1848823746. As a result, the application of magnetic bearings as described by Schweitzer is not practical for many reasons, including magnetic bearing sizing as well as control concerns.

SUMMARY

An engine is provided comprising an internal combustion engine having a plurality of reciprocating pistons within an engine block, each piston having linear movement convertable to rotating movement via a connecting rod connecting each piston to a crankshaft; the crankshaft rotatable about a linear axis, the crankshaft having a plurality of main journals and a plurality of main bearings, each main journal rotatable on a main bearing; and wherein at least one of the main bearings comprises a fluid film bearing and a magnetic bearing.

The magnetic bearing may be arranged to inhibit contact of the fluid film bearing by the crankshaft by arrangement of at least two interacting magnetic fields.

The magnetic bearing may comprise a first magnet and a second magnet with each magnet providing a magnetic field of the at least two interacting magnetic fields; and the first magnet and the second magnet may be arranged such that the interacting magnetic fields of the first magnet and the second magnet are repulsive.

The first magnet and the second magnet may be arranged such that the magnetic interaction between the interacting magnetic fields of the first magnet and the second magnet varies based on a rotation of the crankshaft.

The internal combustion engine may have a four-stroke cycle; and the first magnet and the second magnet may be arranged such that the interacting magnetic fields of the first magnet and the second magnet are repulsive only during a portion of the four-stroke cycle.

The internal combustion engine may have a four-stroke cycle comprising a compression stroke and a combustion stroke; and the first magnet and the second magnet may be arranged such that the interacting magnetic fields of the first magnet and the second magnet are repulsive only during at least one of the compression stroke and the combustion stroke.

The internal combustion engine may have a four-stroke cycle comprising a combustion stroke; and the first magnet and the second magnet may be arranged such that the interacting magnetic fields of the first magnet and the second magnet are repulsive only during the combustion stroke.

The internal combustion engine may have a four-stroke cycle comprising a combustion stroke; and the first magnet and the second magnet may be arranged such that magnetic interaction between the interacting magnetic fields of the first magnet and the second magnet increases during the compression stroke.

Each piston of the engine may have a combustion stroke and a top dead center position at which position the piston is farthest from the crankshaft at a beginning of its combustion stroke; and the first magnet and the second magnet may be arranged such that the interacting magnetic fields of the first magnet and the second magnet are repulsive when at least one of the pistons is at its top dead center position.

The internal combustion engine may have a four-stroke cycle comprising a combustion stroke; and the first magnet and the second magnet may be arranged such that the interacting magnetic fields of the first magnet and the second magnet are at a maximum repulsion during the combustion stroke.

Each piston of the engine may have a combustion stroke and a top dead center position at which position the piston is farthest from the crankshaft at a beginning of its combustion stroke; and the first magnet and the second magnet may be arranged such that the interacting magnetic fields of the first magnet and the second magnet are at a maximum repulsion when at least one of the pistons is in a range from top dead center position to 45 degrees after top dead center position.

The first magnet may be contained in one of the main journals; and the second magnet may be contained in a main bearing housing which surrounds the main journal which contains the first magnet. The main bearing housing may comprise a portion a crankcase cover; and the second magnet may be contained in the crankcase cover. The main bearing housing may also comprise a main bearing cap which connects to the engine block; and the second magnet may be contained in the main bearing cap. The second magnet may be contained in the main bearing cap beneath the fluid film bearing.

At least one of the first and second magnets may be a permanent magnet, a diamagnetic magnet, or an electromagnet.

The engine may further comprise an engine controller programmed to adjust an electric current provided to the electromagnet. The engine controller may be programmed to adjust the electric current provided to the electromagnet based on a position of the crankshaft.

A method of operating an internal combustion engine is provided comprising providing an internal combustion engine comprising a plurality of reciprocating pistons within an engine block, each piston having linear movement convertable to rotating movement via a connecting rod connecting each piston to a crankshaft; the crankshaft rotatable about a linear axis, the crankshaft having a plurality of main journals, each main journal rotatable on a main bearing which supports the crankshaft within the engine block; wherein at least one of the main bearings comprises a fluid film bearing and a magnetic bearing; and wherein the magnetic bearing comprises first and a second magnets arranged to inhibit contact of the fluid film bearing by the crankshaft by arrangement of at least two interacting repulsive magnetic fields; and inhibiting contact of the of the fluid film bearing by the crankshaft with the two interacting repulsive magnetic fields provided between the two magnets.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
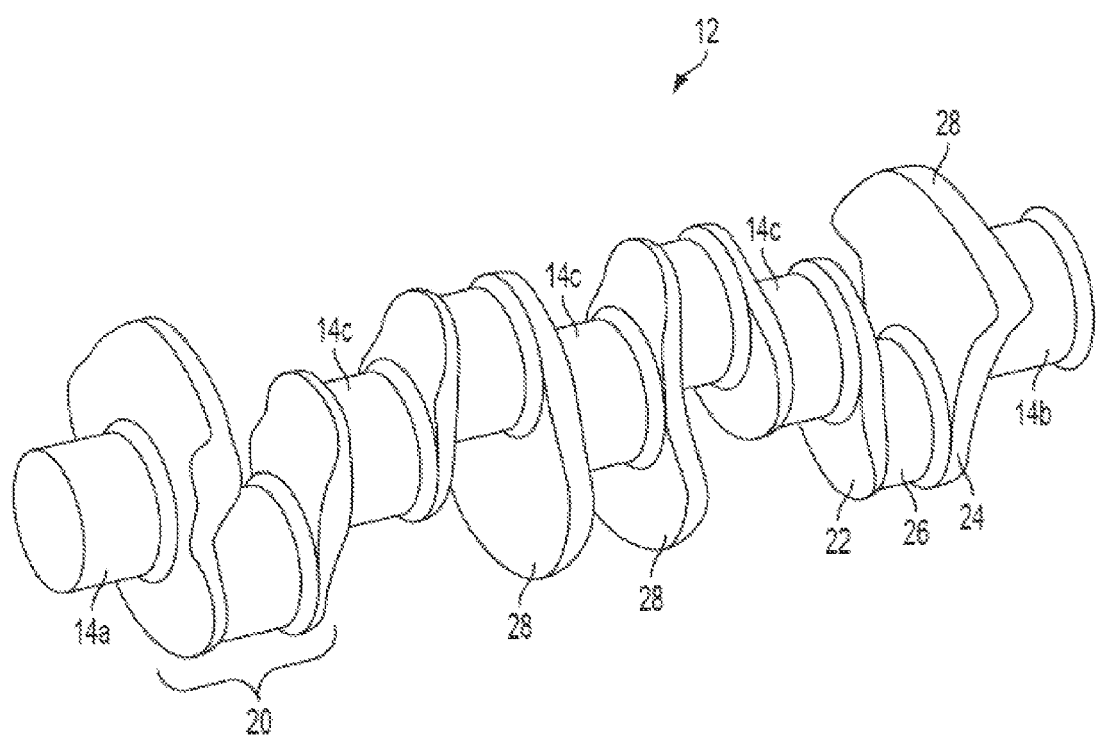
FIG. 1 is an isometric view of an exemplary crankshaft for a four-stroke reciprocating internal combustion engine.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting.

Figure 2:
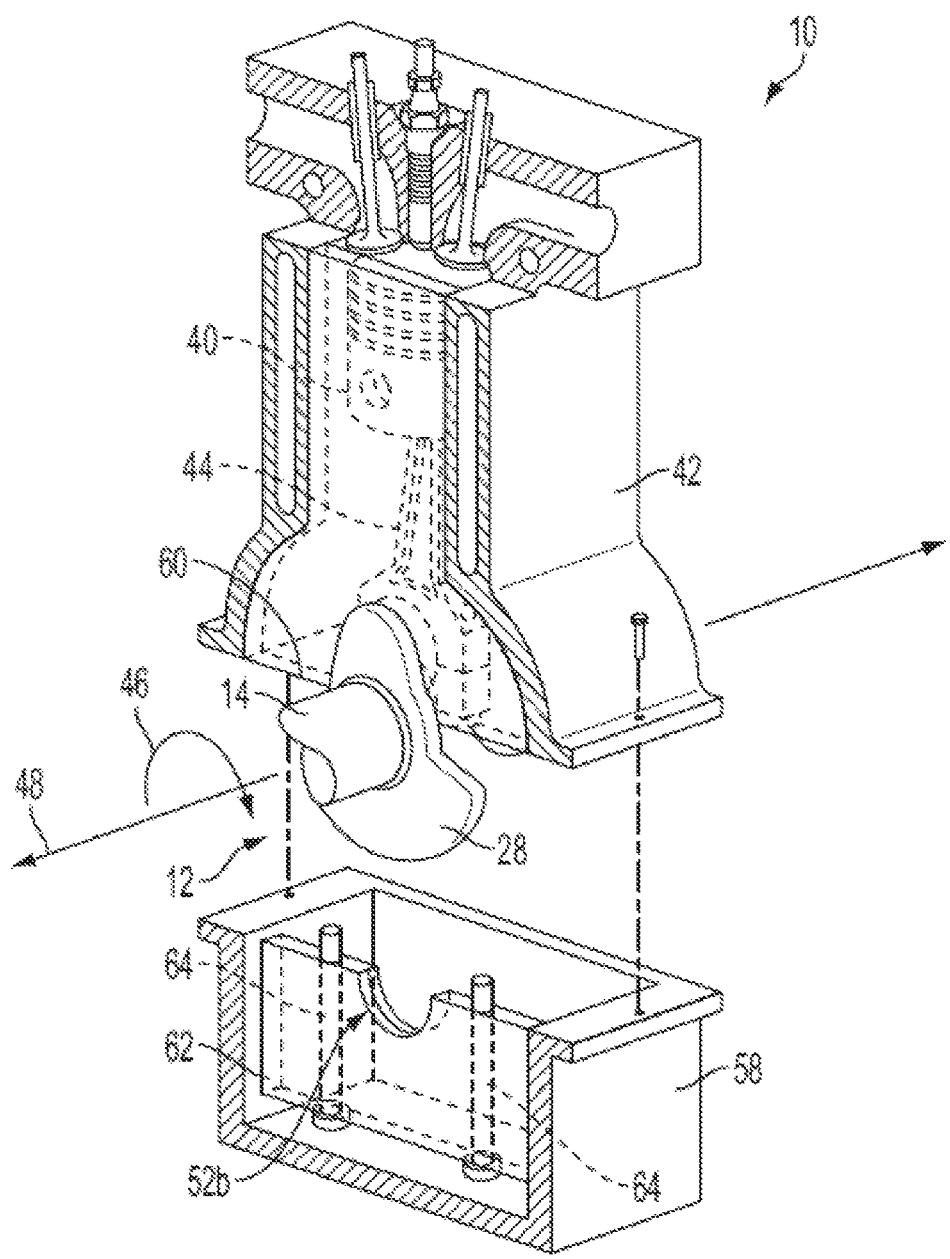
FIG. 2 shows a cross-sectional exploded isometric view of the reciprocating internal combustion engine including the crankshaft.

Referring now to the figures, there is shown an exemplary crankshaft 12 in FIG. 1, particularly for a four-stroke reciprocating internal combustion engine 10 as shown in FIG. 2. Crankshaft 12 may be understood to comprise a plurality of journals 14 comprising a front main bearing journal 14a, a rear main bearing journal 14b and a plurality of intermediate main bearing journals 14c therebetween. Among other things, the main journals 14 serve as support locations for the cranks 20 of the crankshaft 12 and a center axis of rotation 48 for the crankshaft 12. As shown, each of the main journals 14 are located between and separated by a crank 20.

Each crank 20 of the crankshaft 12 comprises two crank arms 22 and 24 separated by a connecting rod bearing journal 26. Each connecting rod journal 26 of each crank 20 is offset from the main journals 14, and provides a location of attachment for a connecting rod 44. The distance of the offset between the connecting rod journal 26 and the main journals 14 may be referred to as the crank-throw. On some crankshafts, part of the crank arms 22, 24 of the crankshaft 12 extends beyond the main journals 14 to form counterweights 28.

Counterweights 28 are used to balance the off center weight of the individual crank throws 20 and thereby compensate for centrifugal forces generated by each rotating crank throw 20. Without such balance, the crank action may create severe vibrations, particularly at higher engine speeds. Due to the reciprocating operation of the internal combustion engine 10, the forces that turn the crankshaft 12 are produced and transmitted to the crankshaft 12 in a reciprocating or pulsating manner. Counterweights 28 are used inertia to reduce the pulsating effect of power impulses. Furthermore, these pulsations often create torsional vibrations, which are capable of severely damaging the internal combustion engine 10 if they are not reduced, or dampened, by opposing forces.

As shown in FIG. 2, internal combustion engine 10 comprises a plurality of reciprocating pistons 40 within a cylinder or engine block 42 (one piston shown, others similar). Each piston 40 has linear movement convertable to rotating movement via a connecting rod 44 connecting each piston 40 to crankshaft 12, which is rotatable as indicated by arrow 46 about linear axis 48 of the crankshaft.

Figure 3:
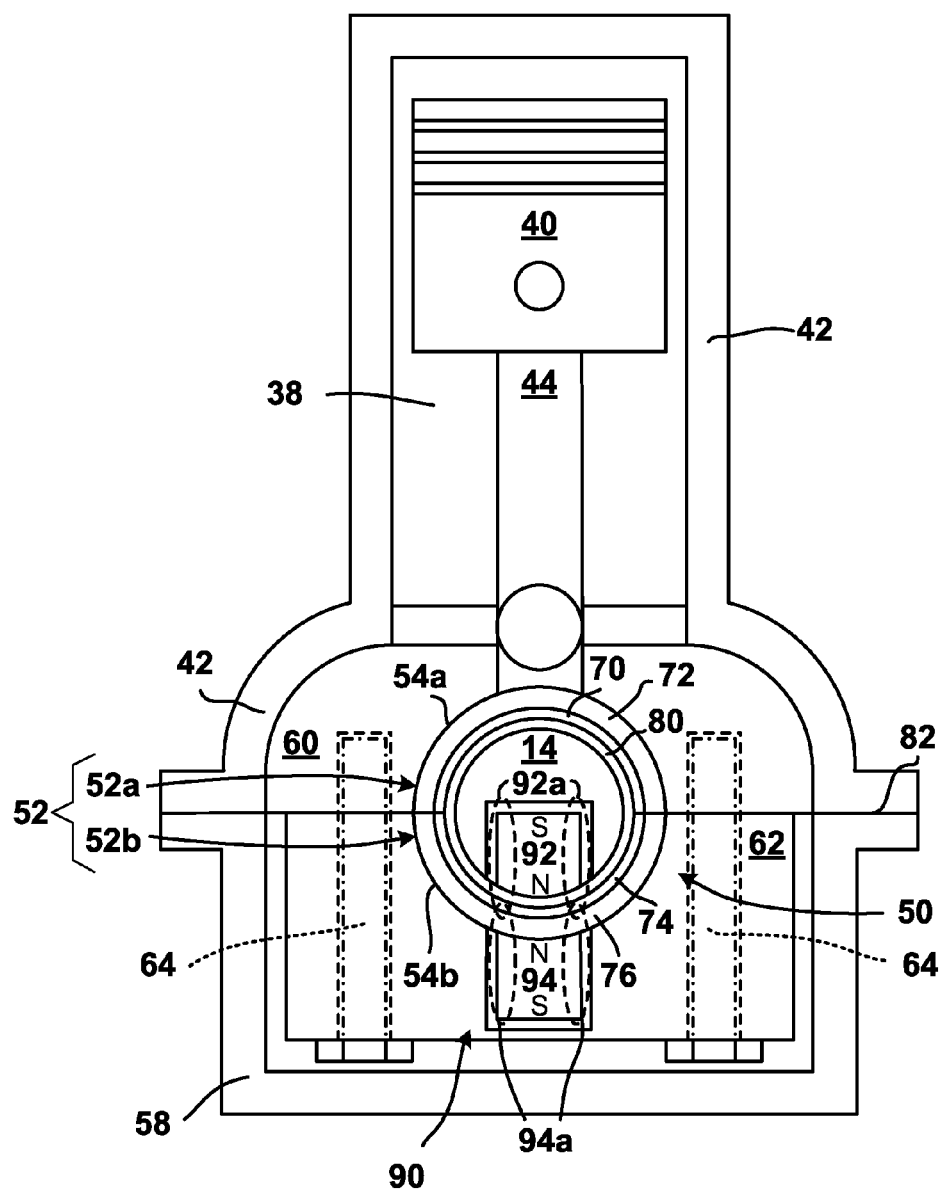
FIG. 3 shows a cross-sectional side view of the internal combustion engine with one embodiment of a main bearing of the present disclosure assembled and the piston of the engine at top dead center position.

As best shown in FIG. 3, each main bearing journal 14 is rotatable on a main bearing 50 which supports the crankshaft 12 within the engine block 42 of the internal combustion engine 12. The main bearing 50 comprises a fluid film bearing 52 having two semi-circular bearing halves 52a and 52b, with each half containing a centrally located circumferential lubricating groove in the working face surface, and which form a cylindrical sleeve which surrounds a main journal 14. One bearing half 52a is located in a semi-circular recess/bore 54a formed in the engine block 42 (in the cross-connecting walls 60 forming the bulkhead of the engine block 42), and the other bearing half 52b is located in a semi-circular recess/bore 54b formed in a main bearing cap 62 which connects to the engine block 42 by threaded fasteners 64. In this manner, the engine block 42 and the main bearing cap 62 form the main bearing housing, as well as portions of the crankcase. In other embodiments, main bearing cap 62 may be an integral part of crankcase cover 58, which closes the lower portion of the crankcase.

Fluid film bearing semi-circular half 52a comprises a bearing inner lining 70 and a bearing outer support 72. Similarly, fluid film bearing semi-circular half 52b comprises a bearing inner lining 74 and a bearing outer support 76. The bearing outer supports 72, 76 comprise a harder material than the bearing inner linings 70, 74.

A substantially uniform annular clearance 80 is provided between main journal 14 and bearing inner linings 70, 74 of bearing halves 52a, 52b, respectively. The main bearing-to-journal clearance 80 may be generally in a range from 0.025 mm to 0.06 mm depending on the internal combustion engine 10.

Initially the bearing halves 52a, 52b have a slightly larger arc than the semi-circular recesses/bores 54a, 54b in which they are respectively seated, which may be referred to as bearing spread. As a result, prior to assembly, each bearing halves 52a, 52b initially protrudes above the parting surface 82 formed between the cross-connecting walls 60 of engine block 42 and main bearing cap 62. When the main bearing cap 62 is assembled to the remainder of the engine block 42, the two ends of the bearing halves 52a, 52b make contact and are slightly crushed together, which may be referred to as bearing crush. The bearing crush holds the fluid film bearing 52 in place without turning when the internal combustion engine 10 is running and the crankshaft 12 is rotating.

Bearing halves 52a, 52b of fluid film bearing 52 form a fluid film (hydrodynamic) bearing, which operates in conjunction with a lubricant, here the engine oil, to reduce friction and associated wear and power loss. Hydrodynamic lubrication may be understood as a type of lubrication in which a lubricant film completely separates two surfaces in contact. Hydrodynamic lubrication is achieved when crankshaft 12 rotates quickly enough for lubrication to flow around the fluid film bearing 50 and cover its entire surface. Hydrodynamic lubrication is also called full-fluid lubrication.

For the fluid film bearing 52, the lubricating system in the internal combustion engine 10 continuously supplies the lubricant (engine oil) to each fluid film bearing 52 such that each main journals 14 of the crankshaft 12 actually roll on a film of the lubricant contained in the annular clearance 80.

As used herein, the fluid film bearings 52 should be non-magnetic. Exemplary materials for the bearing inner linings 70, 74 of fluid film bearings 52 include babbitt (tin-copper; tin-antimony-copper; lead-antimony-tin; copper-lead; lead-tin; copper-tin-lead), copper-lead and aluminum. The inner linings have a thickness generally in a range of 0.25 mm to 0.50 mm. Exemplary materials for the bearing outer supports 72, 76 include non-magnetic metals, ceramics and polymers including fiber-glass reinforced composites.

Oil film break-down, which may occur under particular increased loads as described in greater detail below, may result in one or more of the main journals 14 of the crankshaft 12 coming into contact with the bearing inner linings 70, 74 of fluid film bearings 52. The score resistance of the material for the bearing inner linings 70, 74 prevents the bearing materials from seizing on the crankshaft 12, however localized hot spots of the bearing material may result at the location of contact. This may result in increased wear of the fluid film bearings 52, and associated increased engine friction losses and overall decreased engine mechanical efficiency. As the fluid film bearings 52 wear, the annular clearance 80 between the main journals 14 and the bearing inner linings 70, 74 may increase. An increase in the journal clearance 80 may result in causing more oil to flow from the edges of the fluid film bearings 52. A large oil flow at even one of the fluid film bearings 52 may result in oil starvation of other fluid film bearings 52, resulting in the failure of the oil-starved fluid film bearing 52.

Figure 4:
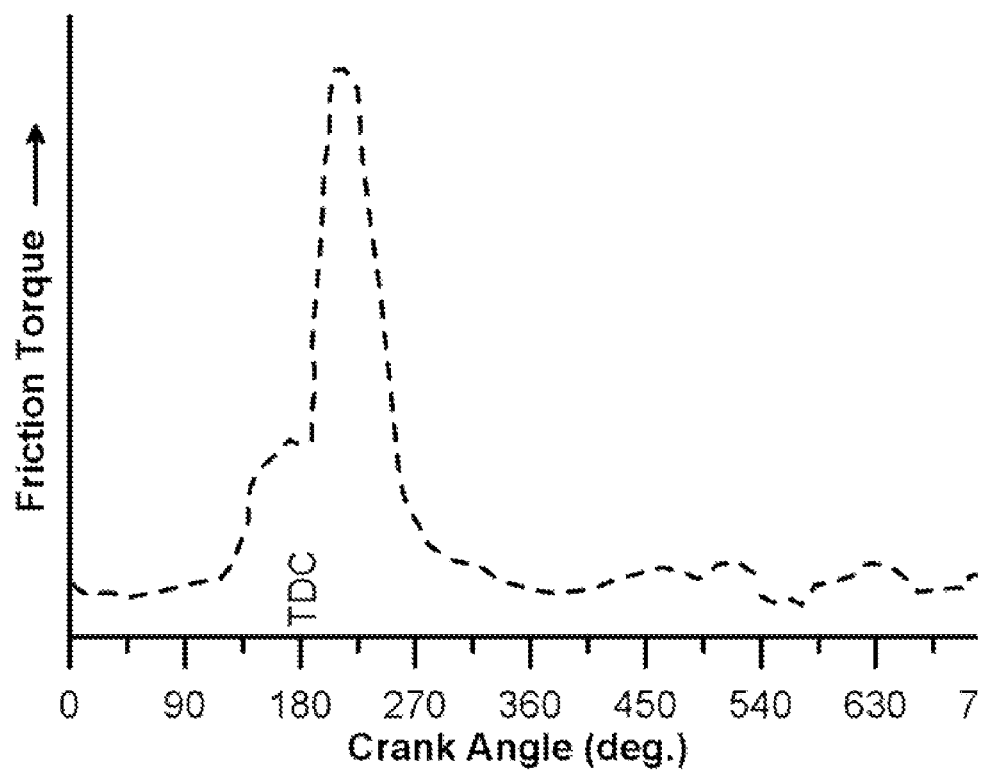
FIG. 4 shows an exemplary graph of friction torque versus crank angle for an internal combustion engine.

As shown in FIG. 4, due to the reciprocating piston motion and applied gas pressure, the load which has to be supported by the fluid film bearings 52 is periodic and is characterized by short pulses (See "Diesel Engine Transient Operation: Principles of Operation and Simulation Analysis" Rakopoulos, C. D., Giakoumis, E. G., Springer, first edition (Mar. 26, 2009), ISBN 1848823746). As the in-cylinder pressure of the internal combustion engine 10 increases due to the ongoing combustion process, this may result in reduced thickness of the oil-film formed between one or more of the main journals 14 and the fluid film bearings 52 as the main journals 14 moves towards the supporting fluid film bearings 52. Worse case, as set forth above, the fluid film bearings 52 are subjected to a momentary load surge, and one or more main journals 14 of the crankshaft 12 coming into contact with the bearing inner linings 70, 74 of fluid film bearings 52.

In order to inhibit contact of the fluid film bearings 52 by one or more main journals 14 of the crankshaft 12, and provide a more uniform annular clearance 80 during the internal combustion engine's operating cycle, the viscosity of the engine oil may be increased, however this may result in decreased fuel economy.

Alternatively, in order to provide a solution to the aforementioned issues related to the internal combustion engine lubrication, the main bearings 50 may further comprise a magnetic bearing 90 in addition to the fluid film bearing 52. As explained in greater detail below, the engine crankshaft 12 maintains the use of fluid film bearings 52 for most of the operating cycle of the internal combustion engine 10 when the load bearing load and associated losses are relatively low. During the highly-loaded portion of the cycle, the magnetic bearings 90 operate against the increased load. For example, in certain one embodiments, repulsion forces between the magnetic fields of magnets may act to levitate the crankshaft 12 towards the center position against the increased load, which may inhibit contact of the fluid film bearings 52 by one or more main journals 14 of the crankshaft 12, and provide a more uniform annular clearance 80 during the internal combustion engine's operating cycle, particularly at the peak load.

Returning to FIG. 3, in the present embodiment, magnetic bearing 90 comprises a permanent magnet 92 and a permanent magnet 94. Permanent magnet 92 is contained in main journal 14 while permanent magnet 94 is contained in the main bearing housing which surrounds main journal 14, beneath fluid film bearing half 52b. More specifically, permanent magnet 94 is contained in main bearing cap 62 which, in certain embodiments, may be part of the crankcase cover 58, or in the engine block 42.

As shown by the orientation of the north and south poles of the magnets 92, 94 with the like poles (N-N) facing each other and the resulting interacting (counteracting) magnetic fields 92a, 94a, the forces of the magnetic fields 92a, 94a pushes the two magnets 92, 94 apart from one another. As such, the magnetic bearing 80 comprises magnets 92, 94 are arranged to inhibit contact of the fluid film bearing 52 by the crankshaft 12 by arrangement of at least two interacting magnetic fields 92a, 94a. More particularly, magnets 92, 94 arranged to inhibit contact of the fluid film bearing 52 by the crankshaft 12 by arrangement of at least two interacting magnetic fields 92a, 94a which are repulsive to one another, via counteracting repulsion/repulsive magnetic forces. Furthermore, as shown, with piston 40 at its top dead center position, the magnets 92, 94 are substantially physically aligned (within 5 degrees) such that a maximum repulsion force of the two interacting magnetic fields 92a, 94a is provided between the two magnets 92, 94.

Figure 5:
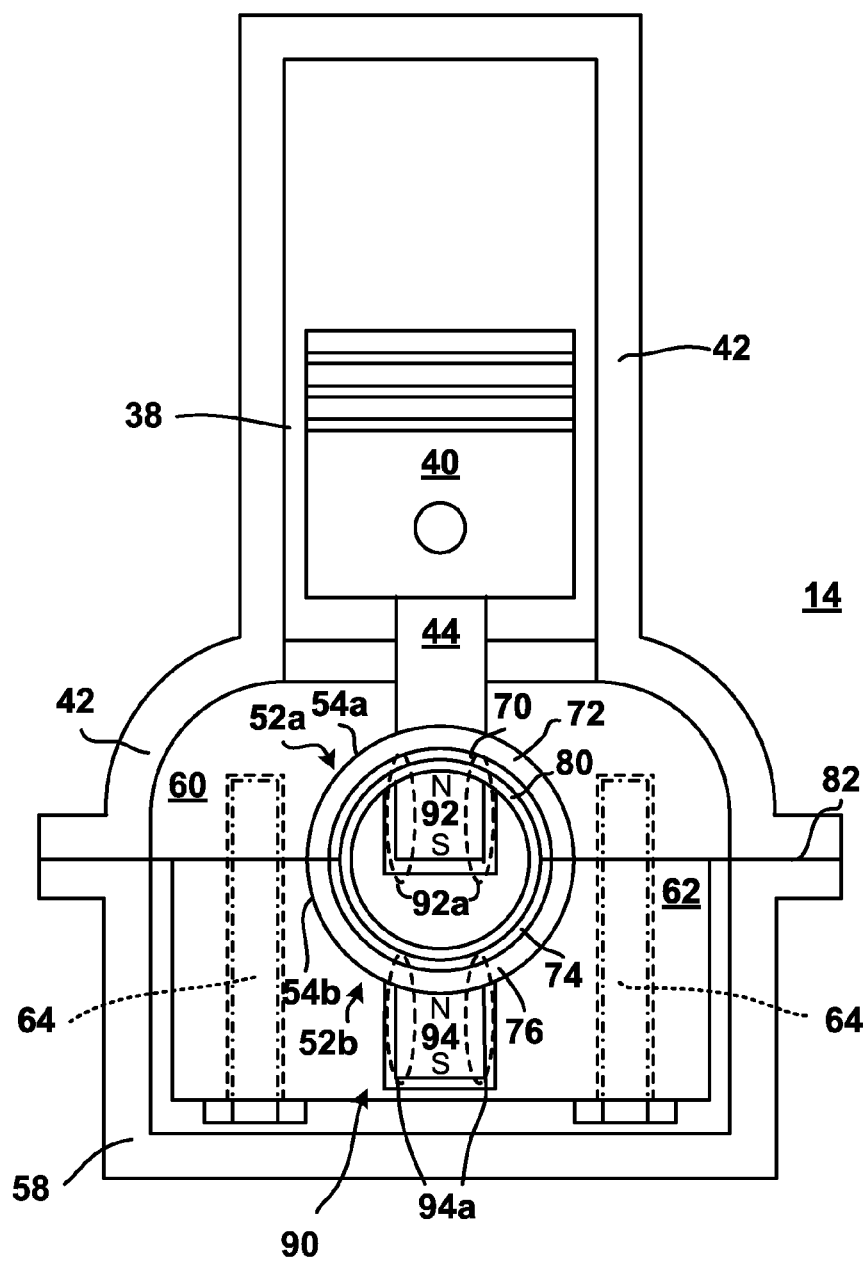
FIG. 5 shows a cross-sectional side view of the internal combustion engine of FIG. 3 with the piston of the engine at bottom dead center position.

Permanent magnets 92, 94 are aligned by a rotation of the crankshaft 12, and it may be understood that the magnets 92, 94 are arranged such that the magnetic interaction between the interacting magnetic fields 92a, 94a of the magnets 92, 94 will vary based on a rotation of the crankshaft 12. In other words, the alignment of magnets 92, 94 varies based on the rotation of the crankshaft 12 and, hence the strength of the repulsion forces of the two magnetic fields 92a, 94a will vary directly. Accordingly, the greater the alignment of magnets 92, 94, the greater the alignment of the magnetic fields and the greater the repulsion force of the two magnetic fields 92a, 94a. Conversely, the less of alignment of magnets, the less the alignment of the magnetic fields and the less the repulsion force of the two magnetic fields 92a, 94a. For example, as shown in FIG. 5, magnets are not aligned when piston 40 is at its bottom dead center position, and there is no repulsion force between the two magnetic fields 92a, 94a of magnets 92, 94.

As further shown by FIG. 3, piston 40 is in its top dead center position (crankshaft angle is at zero (0) degrees and the crank/connecting rod angle is 180 degrees), at which position the piston 40 is farthest from the crankshaft 12 at the beginning of its combustion stroke (or the end of the compression stroke). Depending on fuel injection timing and ignition timing, maximum combustion pressure/force within the cylinder 38 containing piston 40, and the ensuing maximum downward pressure/force on the piston 40 and the crankshaft 12, ordinarily occurs during the combustion stroke, such as within the first 90 degrees of the combustion stroke.

Here, for simplicity of example, it may be understood that the maximum combustion pressure within the cylinder containing piston 40, and the ensuing maximum downward load on the piston 40 and the crankshaft 12, is occurring at the top dead center position of piston 40 (although ordinarily such may happen later in the combustion stroke). As such, magnets 92, 94 are arranged such that the interacting magnetic fields 92a, 94a of the magnets 92, 94 are repulsive when at least one of the pistons 40 is at its top dead center position.

Figure 6:
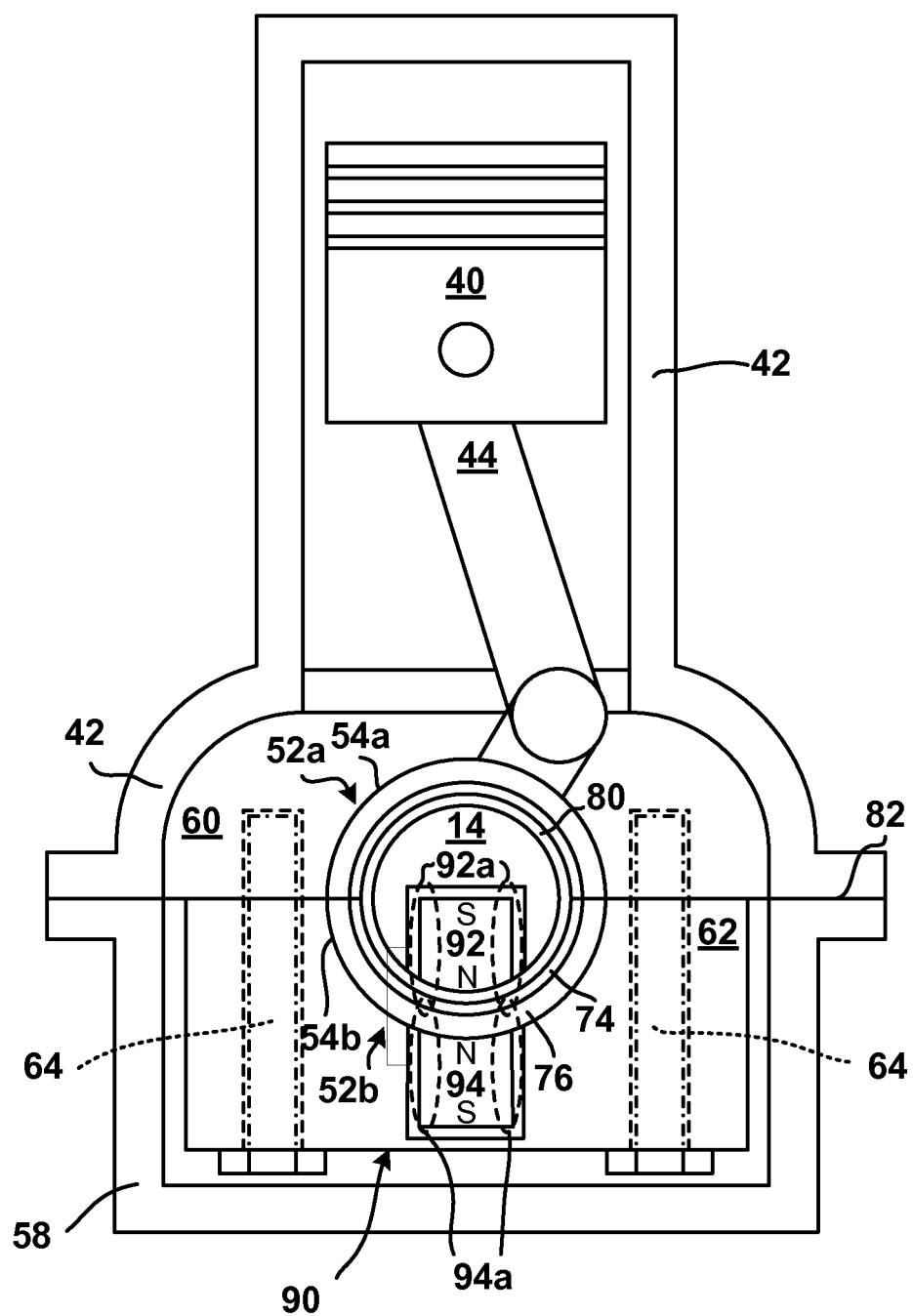
FIG. 6 shows a cross-sectional side view of the internal combustion engine of FIG. 3 with the piston in the combustion stroke.

In other embodiments, as shown in FIG. 6, magnets 92, 94 may be arranged such that a maximum repulsion force of the two magnetic fields 92a, 94a is provided between the two magnets 92, 94 during the compression stroke of piston 40 (after top dead center of piston 40). More particularly, magnets 92, 94 may be arranged such that a maximum repulsion force of the two magnetic fields 92a, 94a is provided between the two magnets 92, 94 when the piston 40 is in a range of the compression stroke from top dead center position to 45 degrees after top dead center position. With the configuration of FIG. 6, it should be understood that as the magnets 92, 94 come into greater alignment during the compression stroke, and the magnets 92, 94 are arranged such that the magnetic interaction between the interacting magnetic fields 92a, 92b of magnets 92, 94 increases during the compression stroke, and that the magnets 92.94 are preferably substantially aligned (within 5 degrees) when the downward pressure/force on the piston 40 and the crankshaft 12 is at a maximum.

Furthermore, from the foregoing, it should be understood that magnets 92, 94 may be arranged such the interacting magnetic fields 92a, 94a of the magnets 92, 94 are repulsive only during a portion of the four-stroke cycle of internal combustion engine 10. It should be further understood that the magnets 92, 94 may be arranged such that the interacting magnetic fields 92a, 94a of the magnets 92, 94 may be repulsive only during the combustion stroke of internal combustion engine 10. In other embodiments, magnets 92, 94 may be arranged such that the interacting magnetic fields 92a, 94a of magnets 92, 94 are repulsive only during at least one of the compression stroke or combustion stroke of internal combustion engine 10.

Figure 7:
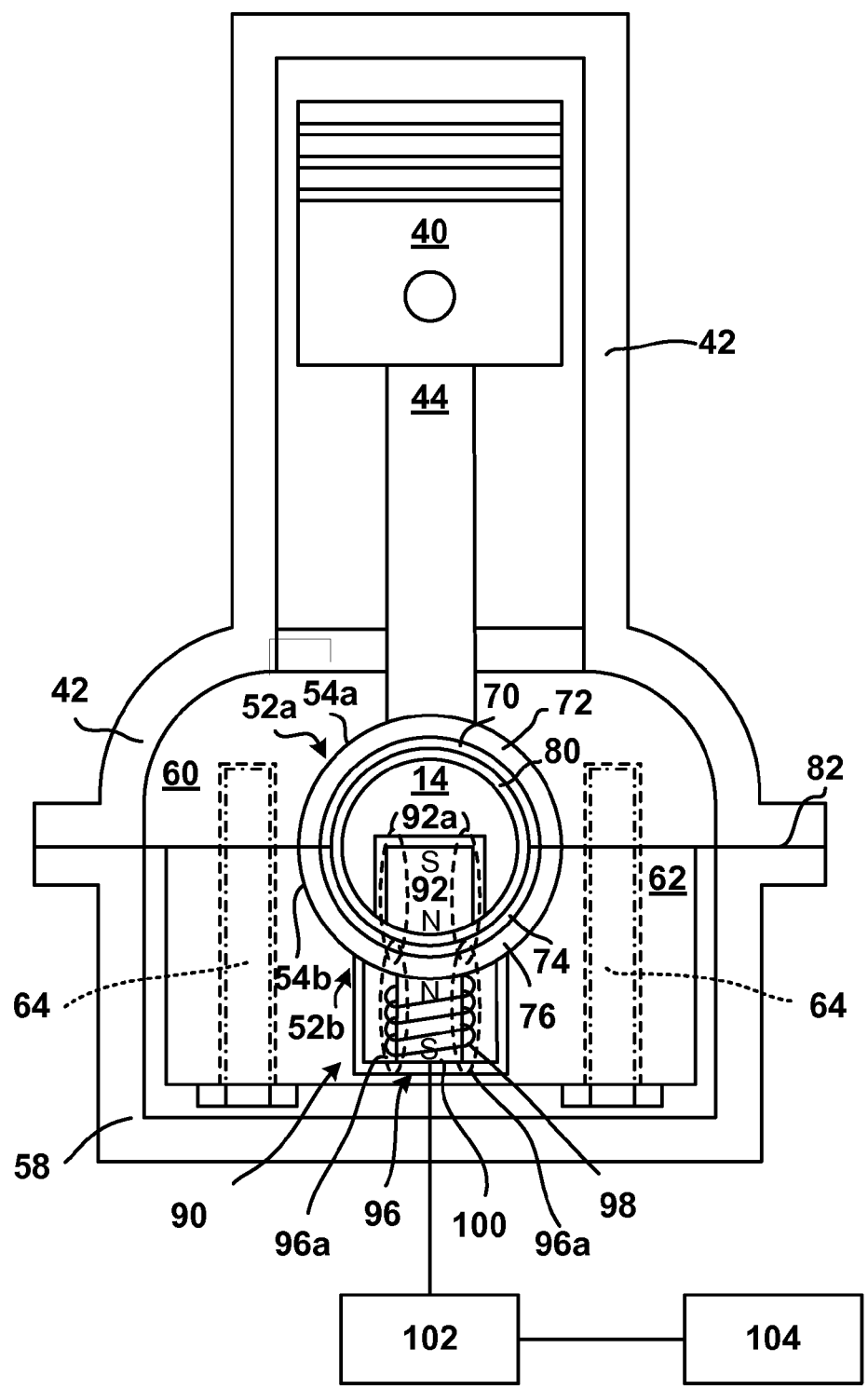
FIG. 7 shows a cross-sectional side view of the internal combustion engine with another embodiment of a main bearing of the present disclosure assembled and the piston of the engine at top dead center position.

In another embodiment of the invention, shown in FIG. 7, the permanent magnet 94 of the magnetic bearing 90 may be replaced with an electromagnet 96 comprising a coil (helix) 98 with a plurality of wire turns lying side-by-side. Electric current flowing in the coil 98 from electrical energy (current) source 102 may create a magnetic field 96a around the coil 98 in a known manner. As shown electromagnet 96 may further comprise a core 100 of ferromagnetic material (in contrast to having an air core) located inside the coil 98. As such, in certain embodiments, electromagnet 96 may more properly referred to as a ferromagnetic-core or iron-core electromagnet.

One advantage of electromagnet 96 over permanent magnet 94 is the ability to control and vary the amount of electric current thereto by controller 104. By increasing the electrical power to coil 98, the magnetic force created by the coil 98 will increase as well as the repulsion force between electromagnet 96 and permanent magnet 92. As such, controller 104 may be programmed to control power (current) to electromagnet 96, and as such adjust the repulsion force provided between the two magnets. Such may be a function of, for example, vehicle acceleration, vehicle speed, transmission gear, oil viscosity, engine revolutions per minute (rpm), crankshaft position and vehicle (engine) mileage.

Figure 8:
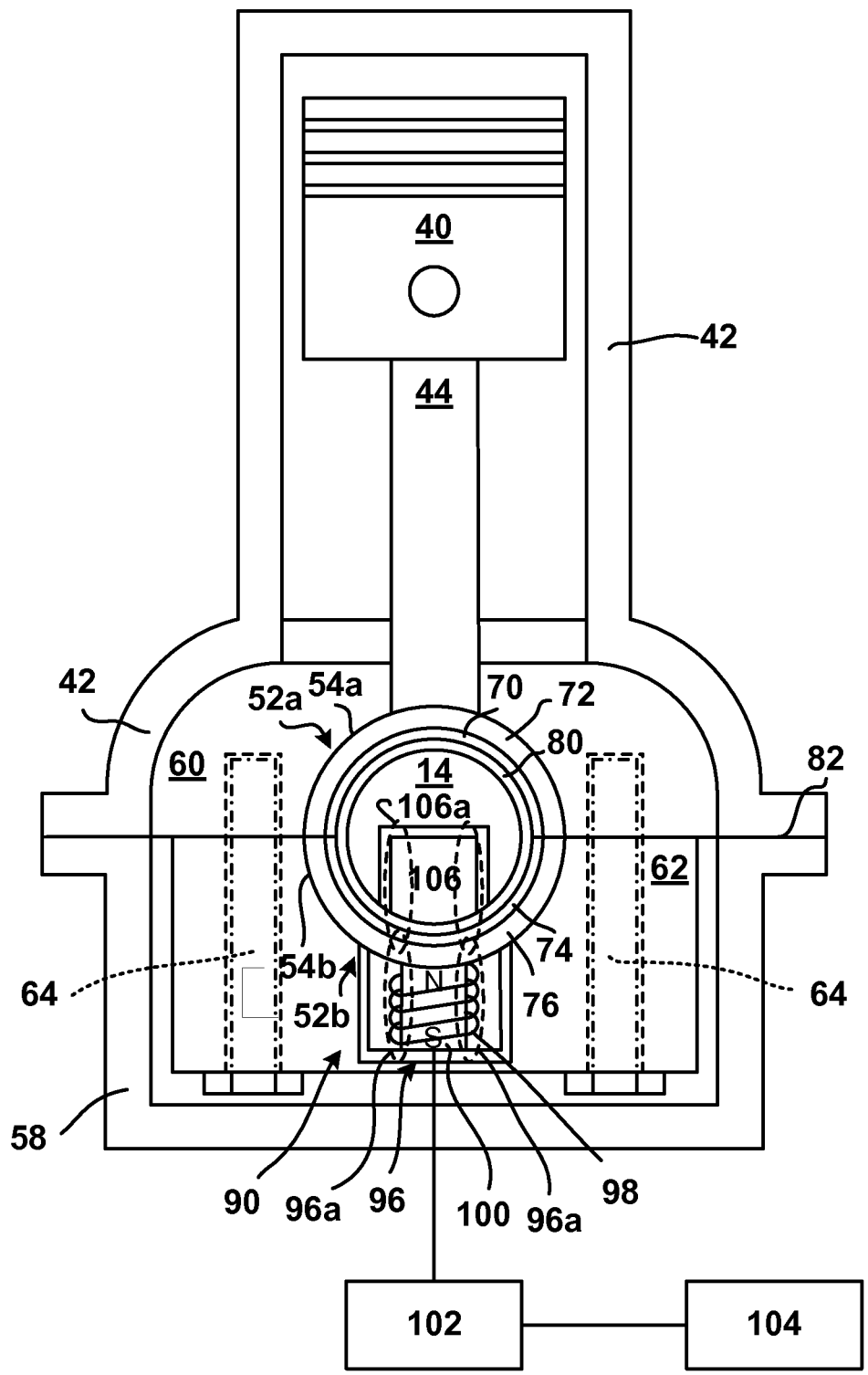
FIG. 8 shows a cross-sectional side view of the internal combustion engine with another embodiment of a main bearing of the present disclosure assembled and the piston of the engine at top dead center position.

In yet another embodiment, as shown in FIG. 8, the permanent magnet 92 may be replaced with a diamagnetic magnet 106, which may be understood a magnet which possesses the property of diamagnetism, or the property to create a magnetic field in opposition to an externally applied magnetic field. Diamagnetic materials have a relative magnetic permeability that is less than or equal to 1.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. An engine comprising:
an internal combustion engine having a plurality of reciprocating pistons within an engine block, each piston having linear movement convertable to rotating movement via a connecting rod connecting each piston to a crankshaft;
the crankshaft rotatable about a linear axis, the crankshaft having a plurality of main journals and a plurality of main bearings, each one of the plurality of main journals rotatable on one of the plurality of main bearings; and
wherein at least one of the main bearings comprises a fluid film bearing and a magnetic bearing.

2. The engine of claim 1 wherein:
the magnetic bearing is arranged to inhibit contact of the fluid film bearing by the crankshaft by arrangement of at least two interacting magnetic fields.

3. The engine of claim 2 wherein:
the magnetic bearing comprises a first magnet and a second magnet with each magnet providing a magnetic field of the at least two interacting magnetic fields; and
the first magnet and the second magnet are arranged such that the magnetic fields provided by the first magnet and the second magnet are repulsive.

4. The engine of claim 3 wherein:
the first magnet and the second magnet are arranged such that the magnetic interaction between the interacting magnetic fields of the first magnet and the second magnet varies based on a rotation of the crankshaft.

5. The engine of claim 3 wherein:
the internal combustion engine has a four-stroke cycle; and
the first magnet and the second magnet are arranged such that the interacting magnetic fields of the first magnet and the second magnet are repulsive only during a portion of the four-stroke cycle.

6. The engine of claim 3 wherein:
the internal combustion engine has a four-stroke cycle comprising a compression stroke and a combustion stroke; and
the first magnet and the second magnet are arranged such that the interacting magnetic fields of the first magnet and the second magnet are repulsive only during at least one of the compression stroke and the combustion stroke.

7. The engine of claim 3 wherein:
the internal combustion engine has a four-stroke cycle comprising a combustion stroke; and
the first magnet and the second magnet are arranged such that the interacting magnetic fields of the first magnet and the second magnet are repulsive only during the combustion stroke.

8. The engine of claim 3 wherein:
the internal combustion engine has a four-stroke cycle comprising a combustion stroke; and
the first magnet and the second magnet are arranged such that magnetic interaction between the interacting magnetic fields of the first magnet and the second magnet increases during the compression stroke.

9. The engine of claim 3 wherein:
each piston has a combustion stroke and a top dead center position at which position the piston is farthest from the crankshaft at a beginning of its combustion stroke; and
the first magnet and the second magnet are arranged such that the interacting magnetic fields of the first magnet and the second magnet are repulsive when at least one of the pistons is at its top dead center position.

10. The engine of claim 3 wherein:
the internal combustion engine has a four-stroke cycle comprising a combustion stroke; and
the first magnet and the second magnet are arranged such that the interacting magnetic fields of the first magnet and the second magnet are at a maximum repulsion during the combustion stroke.

11. The engine of claim 3 wherein:
each piston has a combustion stroke and a top dead center position at which position the piston is farthest from the crankshaft at a beginning of its combustion stroke; and
the first magnet and the second magnet are arranged such that the interacting magnetic fields of the first magnet and the second magnet are at a maximum repulsion when at least one of the pistons is in a range from top dead center position to 45 degrees after top dead center position.

12. The engine of claim 3 wherein:
the first magnet is contained in one of the main journals.

13. The engine of claim 12 wherein:
the second magnet is contained in a main bearing housing which surrounds the main journal which contains the first magnet.

14. The engine of claim 13 wherein:
the main bearing housing comprises a portion a crankcase cover; and
the second magnet is contained in the crankcase cover.

15. The engine of claim 13 wherein:
the main bearing housing comprises a main bearing cap which connects to the engine block; and
the second magnet is contained in the main bearing cap.

16. The engine of claim 15 wherein:
the second magnet is contained in the main bearing cap beneath the fluid film bearing.

17. The engine of claim 3 wherein:
at least one of the first and second magnets is a permanent magnet.

18. The engine of claim 3 wherein:
at least one of the first and second magnets in a diamagnetic magnet.

19. The engine of claim 3 wherein:
at least one of the first and second magnets is an electromagnet.

20. The engine of claim 19 further comprising:
an engine controller programmed to adjust an electric current provided to the electromagnet.

21. The engine of claim 19 further comprising:
the engine controller is programmed to adjust the electric current provided to the electromagnet based on a position of the crankshaft.

22. A method of operating an internal combustion engine comprising:
providing an internal combustion engine comprising,
a plurality of reciprocating pistons within an engine block, each piston having linear movement convertable to rotating movement via a connecting rod connecting each piston to a crankshaft;
the crankshaft rotatable about a linear axis, the crankshaft having a plurality of main journals and a plurality of main bearings, each one of the plurality of main journals rotatable on one of the plurality of main bearings;
wherein at least one of the main bearings comprises a fluid film bearing and a magnetic bearings; and
wherein the magnetic bearing comprises first and second magnets arranged to inhibit contact of the fluid film bearing by the crankshaft by arrangement of at least two interacting repulsive magnetic fields; and
inhibiting contact of the fluid film bearing by the crankshaft with the at least two interacting repulsive magnetic fields provided between the two magnets.

23. The method of claim 22, wherein:
each one of the first and second magnets provides a magnetic field of the at least two interacting repulsive magnetic fields.

24. The method of claim 23, further comprising:
arranging the first magnet and the second magnet such that the magnetic interaction between the interacting magnetic fields of the first magnet and the second magnet varies based on a rotation of the crankshaft.

25. The method of claim 23, wherein:
the internal combustion engine has a four-stroke cycle; and further comprising,
arranging the first magnet and the second magnet such that the interacting magnetic fields of the first magnet and the second magnet are repulsive only during a portion of the four-stroke cycle.

26. The method of claim 23, wherein:
the internal combustion engine has a four-stroke cycle comprising a compression stroke and a combustion stroke; and further comprising,
arranging the first magnet and the second magnet such that the interacting magnetic fields of the first magnet and the second magnet are repulsive only during at least one of the compression stroke and the combustion stroke.

27. The method of claim 23, wherein:
the internal combustion engine has a four-stroke cycle comprising a combustion stroke; and further comprising, arranging the first magnet and the second magnet such that the interacting magnetic fields of the first magnet and the second magnet are repulsive only during the combustion stroke.

28. The method of claim 23, wherein:

the internal combustion engine has a four-stroke cycle comprising a combustion stroke; and further comprising, arranging the first magnet and the second magnet such that magnetic interaction between the interacting magnetic fields of the first magnet and the second magnet increases during the compression stroke.

29. The method of claim 23, wherein:

each piston has a combustion stroke and a top dead center position at which position the piston is farthest from the crankshaft at a beginning of its combustion stroke; and further comprising, arranging the first magnet and the second magnet such that the interacting magnetic fields of the first magnet and the second magnet are repulsive when at least one of the pistons is at its top dead center position.

30. The method of claim 23, wherein:

the internal combustion engine has a four-stroke cycle comprising a combustion stroke; and further comprising, arranging the first magnet and the second magnet such that the interacting magnetic fields of the first magnet and the second magnet are at a maximum repulsion during the combustion stroke.

31. The method of claim 23, wherein:

each piston has a combustion stroke and a top dead center position at which position the piston is farthest from the crankshaft at a beginning of its combustion stroke; and further comprising, arranging the first magnet and the second magnet such that the interacting magnetic fields of the first magnet and the second magnet are at a maximum repulsion when at least one of the pistons is in a range from top dead center position to 45 degrees after top dead center position.

32. The method of claim 22, wherein:

the first magnet is contained in one of the main journals.

33. The method of claim 22, wherein:

the second magnet is contained in a main bearing housing which surrounds the main journal which contains the first magnet.

34. The method of claim 22, wherein:

at least one of the first and second magnets is a permanent magnet.

35. The method of claim 22, wherein:

at least one of the first and second magnets in a diamagnetic magnet.

36. The method of claim 22, wherein:

at least one of the first and second magnets is an electromagnet.

37. The method of claim 36, wherein:

adjusting an electric current provided to the electromagnet with an engine controller.

38. The method of claim 37, wherein:

the engine controller is programmed to adjust the electric current provided to the electromagnet based on a position of the crankshaft.

\* \* \* \* \*